United States Patent Office 3,361,384
Patented Jan. 2, 1968

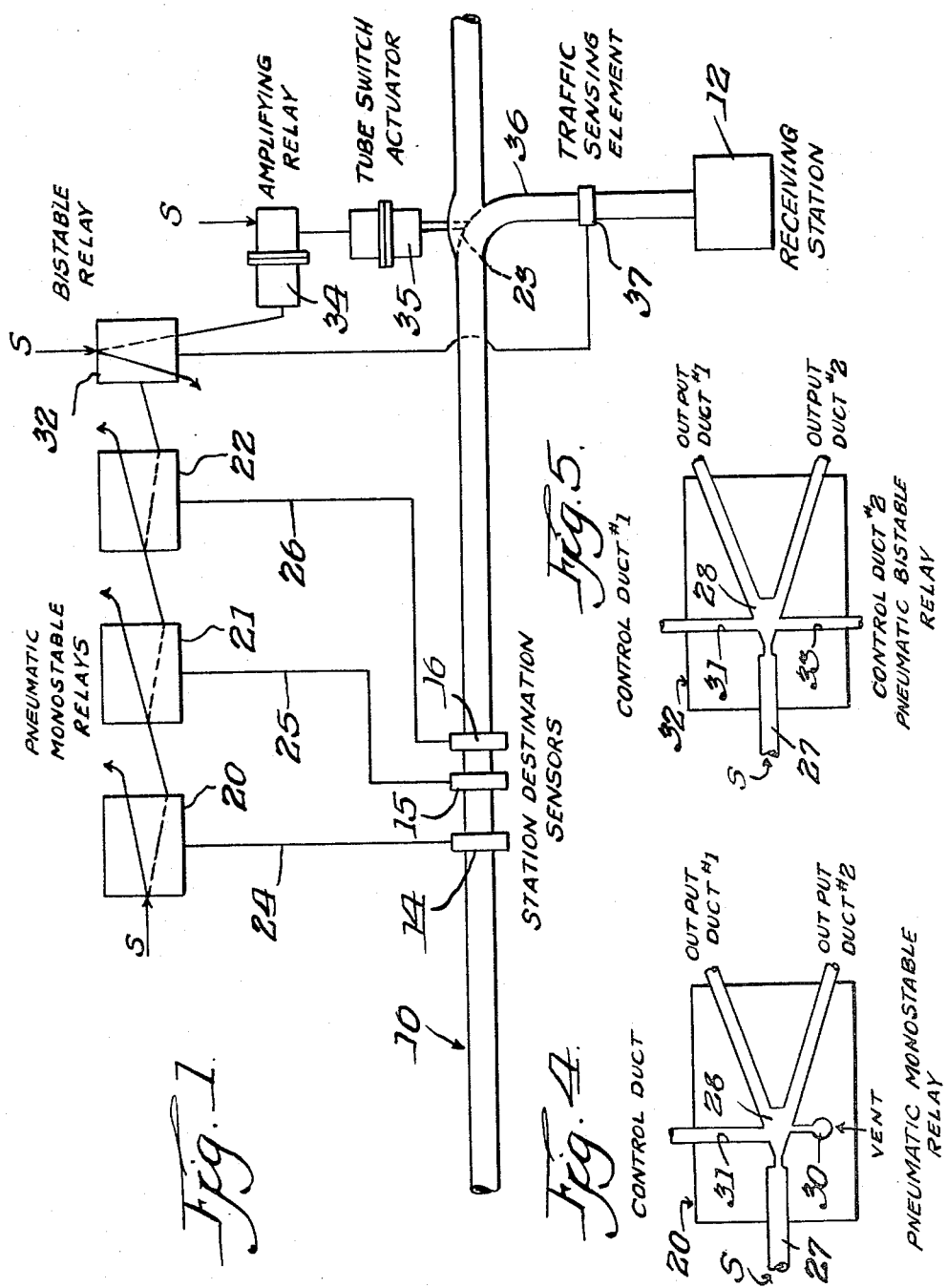

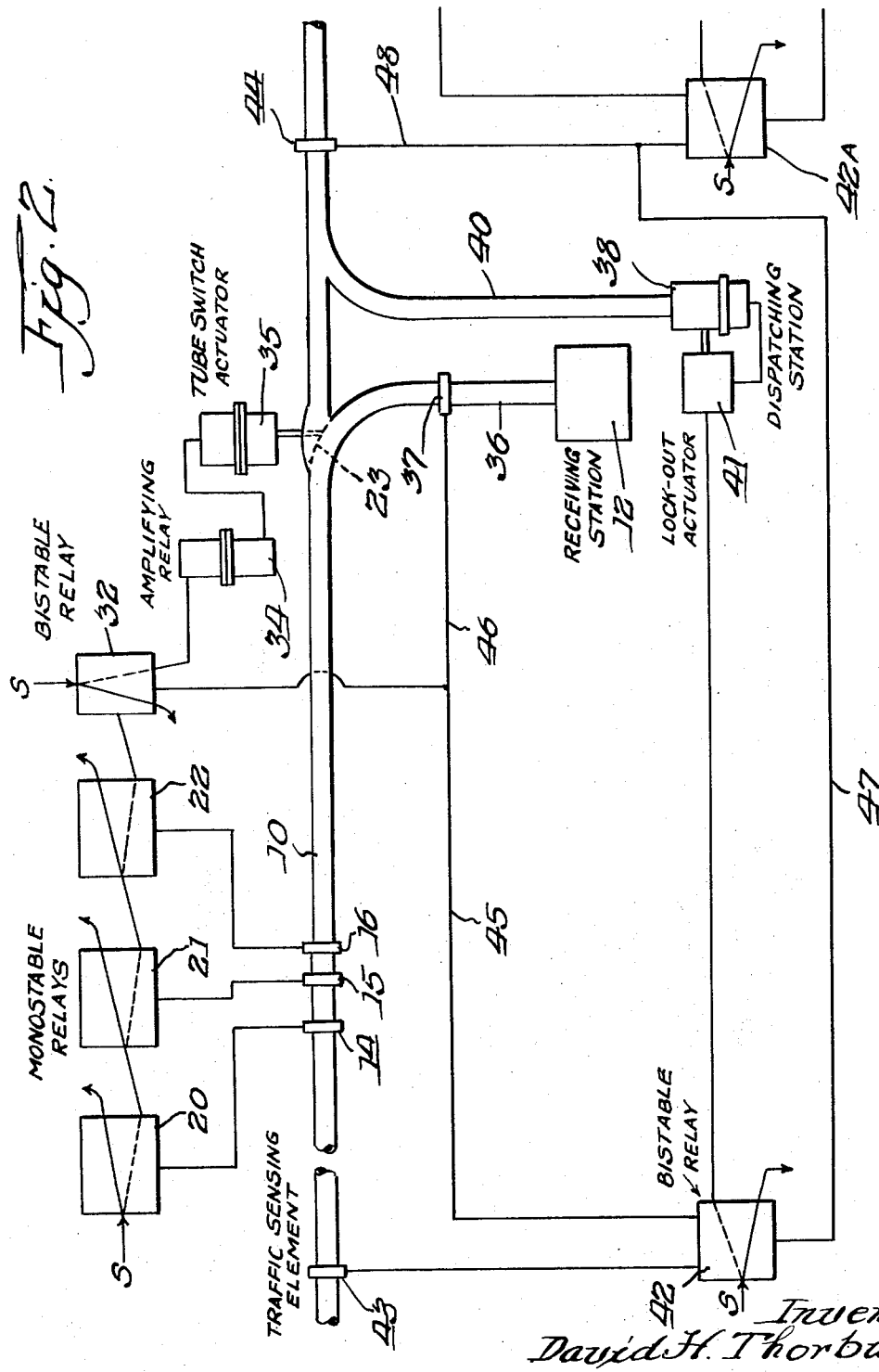

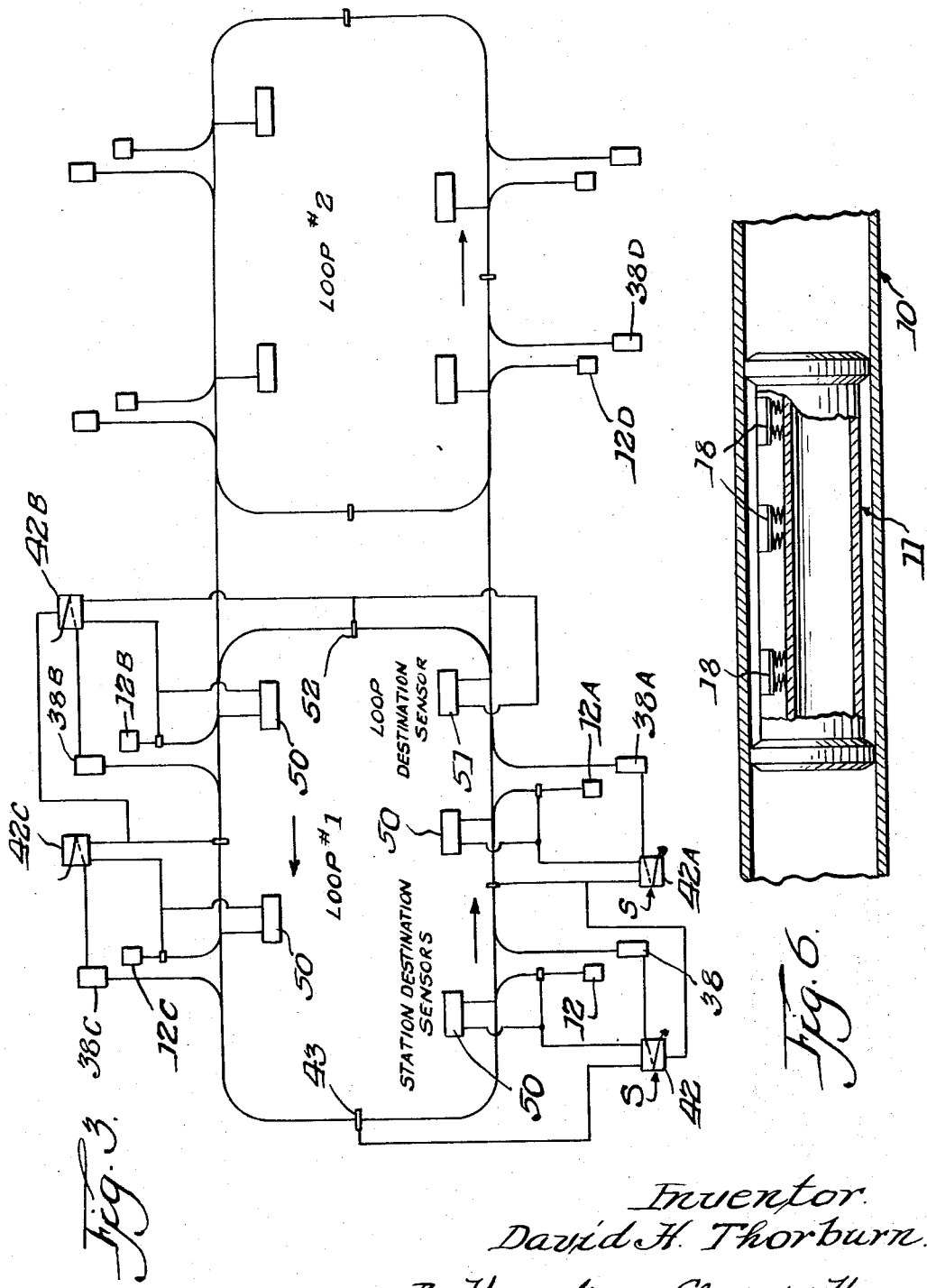

3,361,384
PNEUMATIC TUBE SIGNAL SYSTEM
David H. Thorburn, Oak Park, Ill., assignor to The Powers Regulator Company, Skokie, Ill., a corporation of Illinois
Filed Sept. 29, 1966, Ser. No. 582,802
4 Claims. (Cl. 243—16)

ABSTRACT OF THE DISCLOSURE

Apparatus for controlling the destination of carriers to any one of a plurality of receiving stations spaced along a pneumatic conveyor system. The apparatus includes movable switch means which when actuated into one position will deflect the carrier from the conveyor system into the receiving station and station destination sensor located on the pneumatic conveyor system in advance of each receiving station. A pneumatic monostable relay is provided for each of the station destination sensors. The pneumatic monostable relays are serially connected in cascade to a control pressure duct of a pneumatic bistable relay whereby the bistable relay is activated when the monostable relays are activated simultaneously by their associated sensors. The switch means is moved into position for directing the carrier into a receiving station when the bistable relay is activated. A traffic sensing element is also preferably provided for returning the bistable relay to its inoperative position upon sensing the passage of a carrier. Means for automatically locking and unlocking the dispatch station is also disclosed.

---

The invention relates to conveyor systems and in particular to pneumatic tube conveyor systems and has for its major object the provision of pneumatic relays for actuating the tube switches for routing the carriers either to a designated station or to an adjacent loop.

In pneumatic tube conveyor systems the carriers are provided with elements such as position adjustable magnets which are adapted to coact with scanning means located exteriorly of the tube and which serve to actuate a designated routing switch. The magnets are adjustable along the length of the carrier in order to vary their spacing and the scanning means on the tube may comprise annular coils, the inductance of which are affected by the magnets for energizing electric circuits to bring about the desired positioning of the tube switches. The stations for the discharge of the carriers are designated by the particular spacing of its annular coils and it is necessary for the several spaced magnets on the carrier to coincide with the spacing of the coils at a station in order to effect actuation of the tube switch at said station. Such operation of the tube switch will discharge the carrier to a receiving station or the carrier may be passed on to a connecting loop.

An objective of the present invention is to provide pneumatic relays of the monostable and bistable type for effecting operation of the tube switches in pneumatic tube conveyor system and wherein the pneumatic relays will be made responsive to the unique spacing as regards the elements on the carrier and the scanning means on the conveyor tube.

A further object of the invention is to provide a destination signalling system for a pneumatic tube conveyor which will include pneumatic relays of the monostable type in cascade arrangement and wherein all of the relays in the arrangement must be activated simultaneously in order to produce operation of the tube switch.

Another object of the invention is to provide a destination signalling system for a pneumatic conveyor such as described wherein two or more pneumatic monostable relays are employed in cascade in combination with a pneumatic bistable relay for producing operation of the tube switch when the relays are activated, and wherein the bistable relay is subsequently activated by a traffic sensing element for returning the bistable relay to initial position.

A still further object is to provide a pneumatic bistable relay which will be activated by one or more traffic sensing elements having a particular location on the exterior of a pneumatic tube conveyor, the relay in turn controlling the locking and the subsequent unlocking of a dispatch station.

With these and various other objects in view, the invention may consists of certain novel features of construction and operation, as will be more fully described and particularly pointed out in the specification, drawings and claims appended thereto.

In the drawings which illustrate an embodiment of the device and wherein like reference characters are used to designate like parts.

FIGURE 1 is a schematic view illustrating an arrangement of pneumatic monostable and bistable relays in cascade as applied to a pneumatic tube conveyor for station designation in accordance with the invention;

FIGURE 2 is a schematic view showing an arrangement of pneumatic monostable and bistable relays in cascade for station designation in a pneumatic tube conveyor system and which also illustrates the use of a pneumatic bistable relay for controlling the locking and unlocking of a dispatch station;

FIGURE 3 is a schematic view illustrating the use of pneumatic monostable and bistable relays as applied to a plurality of loops in a tube conveyor system;

FIGURE 4 is a sectional view showing details of a pneumatic monostable relay such as may be employed in the system of the invention;

FIGURE 5 is a sectional view showing details of a pneumatic bistable relay suitable for the present invention; and FIGURE 6 is a sectional detail view of a carrier for a pneumatic tube conveyor system.

The invention is shown in FIGURE 1 as applied to a pneumatic tube conveyor system wherein the tube 10 provides the conveyor for a carrier 11, FIGURE 6, which will be motivated in the direction of air flow in the tube as from left to right and which includes a receiving station 12 for the carrier. It is customary to provide station destination sensors such as 14, 15 and 16 on the exterior of the tube and which may comprise inductance coils or the like capable of being electrically affected by the magnets 18 located on the carriers. The station designation sensors are spaced on the tube 10 in a special manner for each station. For example in FIGURE 1 the sensors 14 and 15 are spaced a greater distance than the sensors 15 and 16. If a carrier is to be discharged to the receiving station 12, then the magnets 18 on the carrier will be spaced in a manner similar to the spacing of the station destination sensors 14, 15 and 16. Accordingly a carrier in passing the sensors will activate all three sensors simultaneously to in turn activate simultaneously all three of the pneumatic monostable relays such as 20, 21 and 22. Simultaneous activation of all three of the relays is necessary for effecting operation of the tube switch 23 which will discharge the carrier to the receiving station 12.

A monostable relay is associated with each one of the sensors, the conductor 24 connecting the sensor 14 with the relay 20, conductor 25 connecting the sensor 15 with the relay 21 and conductor 26 connecting the sensor 16 with the relay 22. Reference is made to FIGURE 4 for a showing of the details of a monostable relay such as 20, it being understood that relays 21 and 22 are similar.

The power input consists of a continuous supply of air under pressure designated S, which is admitted by the conduit 27 to the chamber 28. The chamber 28 divides into an output duct No. 1 and an output duct No. 2. The chamber also communicates with an atmospheric vent 30 and with a control duct 31. The stream of air in flowing through the relay will adhere to the output duct No. 1 until a pneumatic impulse is supplied to the chamber by the control duct 31. This impulse will direct the air stream into the output duct No. 2 and the flow from this duct will continue until the pneumatic impulse from control duct 31 terminates. When the control impulse is terminated the air stream automatically returns to output duct No. 1.

In accordance with the invention a pneumatic impulse is delivered to the control ducts respectively of the relays 20, 21 and 22 when their station designation sensors 14, 15 and 16 are electrically energized by the magnets on a carrier. Any conventional means may be employed of the electrical operable type which will deliver a pneumatic impulse when the same is electrically energized. The monostable relays 20, 21, and 22 are in a cascade arrangement so that when all three are activated they are series connected and the air stream issues from the output duct No. 2 of the last relay 22 to be supplied as a pneumatic impulse to a control duct of the bistable relay 32.

A relay of the bistable type is shown in FIGURE 5 wherein it will be observed that the constructional details of the relay are similar to a monostable relay except that the vent is replaced by a second control duct designated by the numeral 33. As shown in full lines in FIGURE 1 the air stream passing through the chamber 28 adheres to the output duct No. 1 and is discharged to the atmosphere. During such flow the relay is non-operative. However, when the pneumatic pulse from the last monostable relay 22 is delivered to the control duct No. 1, the air stream is deflected to the output duct No. 2 and flow through this duct will activate the volume and pressure amplifying relay 34. This relay becomes operative and effects operation of the tube switch actuator 35 to deflect the tube switch 23 and the carrier 11 is thus delivered to the conduit 36 and into the receiving station 12. When the carrier passes the traffic sensing element 37 the electrical influence from this element is employed to produce a pneumatic pulse which is delivered to the control duct 33 of the bistable relay. This impulse will cause the air stream to return to the output duct No. 1, FIGURE 5, and the bistable relay is thus conditioned for another cycle. This conditioning of the bistable relay 32 so activates the amplifying relay 34 that the tube switch actuator 35 is rendered operative to return the tube switch 23 to its original straight through position.

The station designating means of FIGURE 1 has been incorporated in the structure shown in FIGURE 2 which adds the dispatching station 38 to the disclosure. The said station is joined by the conduit 40 to the main tube conveyor 10 and said station is provided with a door which is opened when it is desired to dispatch a carrier. The locking and unlocking of this door is controlled by a lock out actuator 41. When the tube switch 23 has been operated to discharge a carrier to the receiving station, its passage is noted by the traffic sensing element 37. As previously explained, the electrical influence thus produced in 37 is delivered to the relay 32 to effect a return of said relay and the tube switch to initial positions. In addition to the foregoing the traffic sensing element 37 also deactivates a bistable relay 42.

When the carrier passes the traffic sensing element 43, having location in advance of the station designation sensors, the said traffic sensing element is caused to activate the bistable relay 42 and which in turn will effect actuation of the lock out actuator 41 to lock the door of the dispatching station. This is necessary in order to prevent the dispatch of a carrier which could interfere with the first mentioned carrier and cause a traffic jam. However, in the event the first mentioned carrier is delivered to the receiving station 12 or is passed on through, in which case it will influence the traffic sensing element 44, then a signal is given to the relay 42 to cause an unlocking of the dispatch door. For this purpose the bistable relay 42 is connected by the conductors 45 and 46 with the element 37 and by the conductors 47 and 48 with the traffic sensing element 44.

In FIGURE 3 the circuitry for the station destination sensors 50 is shown for a plurality of stations as regards loop No. 1 and it will be understood that the same is repeated for loop No. 2. When two or more loops are joined in the manner as shown, the structure will additionally incorporate loop destination sensors identified in their entirety by the numeral 51. The sensors for loop destination are similar to that shown and described for FIGURE 1 and the circuitry together with the cascade arrangement of monostable and bistable relays is also basically similar to that of FIGURE 1. However, the carriers will carry more magnets, since a number of said magnets will have to be spaced for station destination while the remaining will be set for loop destination.

The tube switch for a loop destination is normally in a straight through position so that a carrier set for station 12B or 12C will have to trigger the structure 51 and actuate the tube switch so as to direct the carrier to these stations. When a carrier passes the traffic sensing element 52, the loop destination structure is reset for straight through travel of the carriers to loop 2. Had the carrier been set for a station in loop 2 it would not have triggered the structure 51 and would have thus travelled straight through to loop 2.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed:

1. Mechanism for controlling the destination of carriers to any one of a plurality of receiving stations spaced along a pneumatic conveyor system, the combination with movable switch means which when actuated into one position will deflect the carrier from the conveyor and into a receiving station, of station destination sensors for each station including a plurality of receptor coils for creating electric impulses responsive to magnetic signals produced by magnets on the carrier, a plurality of monostable relays at each station corresponding in number to the receptor coils and each relay having operative associated relation with a receptor coil, a bistable relay for each station, the monostable and bistable relays of each station being connected in cascade whereby the bistable relay is rendered operative when the monostable relays are activated simultaneously, means actuated by said bistable relay when the same is rendered operative for moving said switch means into said one position for directing the carriers into the receiving station, a dispatching station located relatively near each receiving station, a lock out actuator for each dispatching station, a second bistable relay in operative associated relation with each lock out actuator, and a traffic sensing element on the pneumatic conveyor system in advance of each receiving station, said traffic sensing element upon sensing the passage of a carrier effecting activation of its bistable relay to cause the relay to actuate the lock out actuator and prevent the insertion of a carrier at the dispatching station.

2. Mechanism for controlling the destination of carriers to any one of a plurality of receiving stations spaced along a pneumatic conveyor system, the combination with movable switch means which when actuated into one position will deflect the carrier from the conveyor system and into a receiving station of: a plurality of station destination sensors located on the pneumatic conveyor system in advance of said receiving station; a source of pneumatic fluid at supply pressure; a pneumatic monostable relay for each of said station destination sensors, each of said pneumatic monostable relays having an interior chamber, an inlet conduit for providing a fluid stream in said interior chamber, at least one outlet signal duct and a control pressure duct connected to the associated station destination sensor for applying a pressure impulse to said fluid stream to direct said fluid stream into said outlet signal duct when said associated station destination sensor is activated, said fluid stream flowing into said outlet signal duct only so long as the pressure from said control pressure duct is applied to said fluid stream; a pneumatic bistable relay for each station, said bistable relay having an interior chamber, an inlet conduit connected to said source of pneumatic fluid at supply pressure for providing a fluid stream in said chamber, at least one outlet signal duct, and first and second opposed control pressure ducts, said first control pressure being adapted to apply a pressure impulse through said fluid stream to direct said fluid stream into said outlet signal duct and said second control pressure duct being adapted to apply a pressure impulse to said fluid stream to direct said fluid stream away from said outlet signal duct, said fluid stream maintaining the condition imposed by the last pressure impulse from one of said first and second control pressure ducts until an opposing pressure impulse is applied from the other of said first and second control pressure ducts, the pneumatic monostable relays of each station being connected in cascade to said first control pressure duct of said pneumatic bistable relay such that said pneumatic bistable relay is activated when all of the pneumatic monostable relays in cascade are activated simultaneously; and means connected to the outlet signal duct of said pneumatic bistable relay for actuation by said pneumatic bistable relay when the same is activated for moving said switch means into said one position for directing the carrier into the receiving station.

3. Mechanism for controlling the destination of carriers to any one of a plurality of receiving stations spaced along a pneumatic conveyor system, the combination with movable switch means which when actuated into one position will deflect the carrier from the conveyor system and into a receiving station of: a plurality of station destination sensors located on the pneumatic conveyor system in advance of said receiving station; a source of pneumatic fluid at supply pressure; a pneumatic monostable relay for each of said station destination sensors, each of said pneumatic monostable relays having an interior chamber, an inlet conduit for providing a fluid stream in said interior chamber, at least one outlet signal duct and a control pressure duct connected to the associated station destination sensor for applying a pressure impulse to said fluid stream to direct said fluid stream into said outlet signal duct when said associated station destination sensor is activated, said fluid stream flowing into said outlet signal duct only so long as the pressure from said control pressure duct is applied to said fluid stream; a pneumatic bistable relay for each station, said bistable relay having an interior chamber, an inlet conduit connected to said source of pneumatic fluid at supply pressure for providing a fluid stream in said chamber, at least one outlet signal duct, and first and second opposed control pressure ducts, said first control pressure being adapted to apply a pressure impulse through said fluid stream to direct said fluid stream into said outlet signal duct and said second control pressure duct being adapted to apply a pressure impulse to said fluid stream to direct said fluid stream away from said outlet signal duct, said fluid stream maintaining the condition imposed by the last pressure impulse from one of said first and second control pressure ducts until an opposing pressure impulse is applied from the other of said first and second control pressure ducts, the pneumatic monostable relays of each station being serially connected in cascade whereby the inlet conduit of the first pneumatic monostable relay in the cascade series is connected to said source of pneumatic fluid at supply pressure and the inlet conduit of each succeeding pneumatic monostable relay in the series is connected to the outlet signal duct of the preceding pneumatic monostable relay and the outlet signal duct of the last pneumatic monostable relay in the cascade series is connected to said first control pressure duct of said pneumatic bistable relay such that said pneumatic bistable relay is activated when all of the pneumatic monostable relays in the cascade series are activated simultaneously; means connected to the outlet signal duct of said pneumatic bistable relay for actuation by said pneumatic bistable relay when the same is activated actuating said switch means into said one position for directing the carrier into the receiving station; and a traffic sensing element located on the pneumatic carrier system between the switch means and the receiving station and connected to the second control pressure duct of said pneumatic bistable relay for deactivating said pneumatic bistable relay upon sensing the passage of a carrier into the receiving station for deactuating said switch means.

4. Mechanism for controlling the destination of carriers from a dispatch station to any one of a plurality of receiving stations spaced along a pneumatic conveyor system, the combination with movable switch means which when actuated into one position will deflect the carrier from the conveyor system and into a receiving station of: a plurality of station destination sensors located on the pneumatic conveyor system in advance of said receiving station; a source of pneumatic fluid at supply pressure; a pneumatic monostable relay for each of said station destination sensors, each of said pneumatic monostable relays having an interior chamber, an inlet conduit for providing a fluid stream in said interior chamber, at least one outlet signal duct, and a control pressure duct connected to the associated station destination sensor for applying a pressure impulse to said fluid stream to direct said fluid stream into said outlet signal duct when said associated station destination sensor is activated, said fluid stream flowing into said outlet signal duct only so long as the pressure from said control pressure duct is applied to said fluid stream; first and second pneumatic bistable relays for each station each of said bistable relays having an interior chamber, an inlet conduit connected to said source of pneumatic fluid at supply pressure for providing a fluid stream in said chamber, at least one outlet signal duct, and first and second opposed control pressure ducts, said first control pressure duct being adapted to apply a pressure impulse through said fluid stream to direct said fluid stream into said outlet signal duct and said second control pressure duct being adapted to apply a pressure impulse to said fluid stream to direct said fluid stream away from said outlet signal duct, said fluid stream maintaining the condition imposed by the last pressure impulse from one of said first and second control pressure ducts until an opposing pressure impulse is applied from the other of said first and second control pressure ducts, the pneumatic monostable relays of each station being serially connected in cascade whereby the inlet conduit of the first pneumatic monostable relay in the cascade series is connected to said source of pneumatic fluid at supply pressure and the inlet conduit of each succeeding pneumatic monostable relay in the series is connected to the outlet signal duct of the preceding pneumatic monostable relay and the outlet signal duct of the last pneumatic monostable relay in the cascade series is connected to the first control pressure duct of said first pneumatic bistable relay such that said first pneumatic bistable relay is activated when all of the pneumatic monostable relays in the cascade series are activated simultaneously; means connected to the outlet signal duct of said first pneumatic bistable relay for actuation by said first pneumatic bistable relay when the same is activated for moving said switch means into said one position for directing the carrier into the receiving station; a first traffic sensing element located on the pneumatic conveyor system between the switch means and the receiving station and connected to the second control pressure duct of said first pneumatic bistable relay for deactivating said first pneumatic bistable relay upon sensing the passage of a carrier into the receiving station; a lockout actuator for said dispatch station, said lockout actuator being connected to said second pneumatic bistable relay; a second traffic sensing element on the pneumatic conveyor system in advance of the receiving station and connected to said second pneumatic bistable relay so as to activate said second pneumatic bistable relay upon sensing the passage of a carrier to cause said second bistable relay to activate said lockout actuator to prevent the insertion of a carrier at said dispatch station, said second pneumatic bistable delay being connected to the first traffic sensing element associated with the receiving station so that said second pneumatic bistable relay is deactivated when said first traffic sensing element senses the passage of a carrier into the receiving station to deactivate said lockout actuator.

References Cited

UNITED STATES PATENTS

| | | | |
|---|---|---|---|
| 1,797,864 | 3/1931 | Harlandt | 243—16 |
| 2,900,146 | 8/1959 | Hafner | 243—16 |
| 3,222,577 | 12/1965 | Kennedy | 243—16 |

RICHARD E. AEGERTER, *Primary Examiner.*

EVON C. BLUNK, *Examiner.*

H. C. HORNSBY, *Assistant Examiner.*